United States Patent Office 3,657,175
Patented Apr. 18, 1972

3,657,175
CARBOXYLIC ACID LATICES PROVIDING UNIQUE THICKENING AND DISPERSING AGENTS
Carl A. Zimmerman, Dover, Del., assignor to Standard Brands Chemical Industries, Inc., Dover, Del.
No Drawing. Filed June 26, 1969, Ser. No. 836,956
Int. Cl. C08f 37/08
U.S. Cl. 260—29.6 T    10 Claims

ABSTRACT OF THE DISCLOSURE

A latex composition comprising a stable aqueous dispersion of a copolymer prepared in an acid aqueous medium by emulsion polymerization of monomeric material containing from about 20% to about 55% by weight of methacrylic acid, from about 3% to about 35% by weight of an ester of an ethoxylated alcohol, e.g., an ester of maleic anhydride and dinonylphenoxypoly(ethyleneoxy)-ethanol, and a balance comprising at least 35% by weight of styrene, butadiene or mixtures thereof.

Thickening agents having exceptional thickening efficiency and polymeric emulsifiers are prepared from this latex composition by adjusting the composition to an alkaline pH.

---

This invention relates to unique latices of methacrylic acid copolymers, polymeric thickening and dispersing agents formed from these latices, and a method of thickening an aqueous system, e.g., a dispersion of solution, especially a dispersion of polymeric solids, by the addition of the thickening agent as well as the thickened aqueous system obtained thereby.

Many thickening agents are known which may be used to increase the viscosity of aqueous systems including dispersions such as latices of natural or synthetic polymers in coatings or other various applications wherein such aqueous systems are employed. Among these known agents are the salts of polyacrylic acid and polymethacrylic acid and the hydrolyzed products of esters, amides, or nitriles of acrylic acid. These known thickening agents usually are added in relatively large amounts as highly viscous solutions in order to impart the necessary thickening effect to the aqueous system.

Numerous problems are encountered in the preparation of and in the use of the known thickening agents. For example, the hydrolysis step of the hydrolyzed thickening agent must be carefully controlled to obtain a thickening agent (or thickener) possessing the desired thickening ability. Also the user of the hydrolyzed thickening agent must usually store it in its viscous state, and must have equipment that will uniformly blend the thickening agent with the aqueous system to be thickened. Also it has been found that the relatively large amounts of thickening agent required alters the relative proportions of solid materials within an aqueous dispersion and often causes the resulting physical properties and chemical characteristics of the dispersion when used as an adhesive or coating to be adversely affected.

Also various dispersing agents (or dispersants), such as sodium lauryl sulfate, are known that are used to produce printing pastes, inks or like coating for textiles, paper and the like products. Many of these agents, however, cause the resulting coatings to be water sensitive and to lack the desired crock-fastness and wash-fastness for specific applications.

Advantageously, this invention produces acid latices which can be used as in situ polymeric thickening agents, which can be easily stored and then blended with the aqueous system to be thickened, and which can be used in relatively small quantities to obtain excellent thickening effects. Moreover, the thickening agents of this invention have such high thickening efficiency that they will form viscous solutions with dilute aqueous solutions of inorganic or organic materials as well as with water itself. In addition, the polymeric dispersing agents formed by the acid latices of this invention will produce pigment pastes, inks, binders and the like coatings which exhibit improved crock-fastness and/or wash-fastness.

Thus, this invention contemplates a stable latex, comprising an aqueous dispersion of a copolymer prepared in an acid aqueous medium by emulsion polymerization of monomeric material containing from about 20 to about 55 percent by weight of methacrylic acid, from about 3 to about 35 percent by weight of an ester of an ethylenically unsaturated carboxylic acid anhydride and an ethoxylated alcohol, and the balance comprising at least about 35 percent by weight of styrene, butadiene or mixtures thereof.

In accordance with this invention, unique polymeric thickening and/or dispersing agents are produced by polymerizing monomeric material containing methacrylic acid, a partial ester of an ethylenically unsaturated anhydride such as maleic anhydride and a polyethoxylated aliphatic or aromatic alcohol such as octylphenoxypoly(ethyleneoxy)ethanol and a comonomer such as butadiene, in selected weight proportions, in an acid aqueous medium under emulsion polymerization conditions to form a stable acid latex, i.e., an aqueous dispersion of polymeric solids, and by adjusting the acid latex to an alkaline pH.

Advantageously, it has been found that the acid latices of this invention may be employed as in situ thickening agents. It will be understood that the term "in situ thickening agent" as used herein refers to a thickening agent which can be added to an aqueous system in a relatively non-viscous condition, blended uniformly therein and then converted to a highly viscous condition with the aqueous system. The acid latex of this invention may be admixed with an acid or slightly alkaline aqueous system and the viscosity of the aqueous system can then be greatly increased by the simple addition of an alkaline material to adjust the pH of the system to a higher, more alkaline value, i.e., a pH of from about 8 to about 10.

In addition, it has also been found that by proper selection of the monomeric content of the monomeric material used to form the acid latex, the resulting latex product can be made to exhibit properties suitable for use as a thickener for water and water-containing systems or as a stabilizer, emulsifier, or dispersant for latices, pigment slurries, printing inks or other aqueous dispersions which may or may not also contain organic solvents.

The amount of methacrylic acid contained in the monomeric material used to prepare the acid latices of this invention has been found to be critical. The maximum level of the methacrylic acid monomer is about 55 percent by weight. Above this level, apparently homopolymerization of the acid occurs, since there is formation of prefloc, i.e., unstable coagulated polymeric solids which separate from the emulsion polymerization system. Optimum thickening efficiency for the latex, when used as a thickening agent, is usually obtained by using methacrylic acid in amounts in excess of about 45 percent by weight. Often reduction in methacrylic acid below about 50 percent by weight of the monomeric material results in a sharp drop in thickening efficiency. Therefore, for the purpose of preparing thickening agents, methacrylic acid is preferably from about 40 to 55 percent by weight of the monomeric material used.

As used herein the term "thickening efficiency" refers to the comparison of an increase in viscosity or thickening effect produced by the addition of a minimum amount of a thickening agent of this invention to an aqueous system, e.g., an aqueous dispersion of a polymeric material or other insoluble materials, with that produced by a same amount another thickening agent.

For preparing latices suitable as emulsifiers, dispersants or stabilizers it has been found that lower levels of the methacrylic acid are necessary. The optimum level for the acid is about 30 percent by weight. Apparently this amount represents the balance point between the stabilization properties and thickening properties of the resulting latex. Thus, as the amount of acid in the monomeric material is raised above 30 percent by weight, the latex obtained will also act as a thickener. When the acid is reduced, the stabilization properties also decrease. The minimum level of methacrylic acid is about 20 percent by weight of the monomeric material. Below this level solubility of the latex in an alkaline solution, e.g., ammonia-containing system is substantially reduced.

It will be understood that other carboxyl-containing monomers may be substituted for the methacrylic acid monomer in minor amounts, i.e., up to about 10 percent by weight based on the total weight of the monomeric material. Among the monomeric carboxyl-containing materials that may be used are the monocarboxylic acids such as acrylic acid, polycarboxylic acids such as maleic acid, fumaric acid, and itaconic acid, partial esters of the polycarboxylic acids such as monomethyl itaconate, monobutyl itaconate, and monobutyl fumarate, and anhydrides such as maleic anhydride. Preferably methacrylic acid is used alone because other carboxyl-containing monomers do not appear to improve the stabilization properties or the thickening efficiency of the resulting latex.

Various esters of an anhydride of an ethylenically unsaturated carboxylic acid and an ethoxylated alcohol may be employed to form the acid latices of the invention. The suitable anhydrides for forming these esters are those which are derived from polycarboxylic acids such as maleic anhydride, itaconic anhydride, citraconic anhydride, and the like, and which contain from 4 to 8 carbon atoms. Maleic anhydride is especially preferable because of its availability, cost and reactivity.

The ethoxylated alcohols used to esterify the anhydrides are nonionic surfactants which may be aliphatic or aromatic in character. These alcohols are represented by the following general formulae:

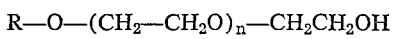

and

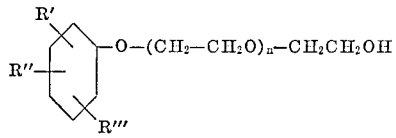

wherein R and R' are alkyl radical containing from 8 to 24 and preferably 8 to 16 carbon atoms R'' and R''' are hydrogen or the alkyl radicals represented by R or R' and $n$ represents the degree of oxyethylation of the alcohol which ranges from about 6 to about 150 and preferably about 15 to 30 moles of ethylene oxide per mole of the phenolic or branched or straight chain alcohol from which the ethoxylated alcohols are derived.

It will be appreciated that R', R'' and R''' may be the same or different alkyl radicals. The following alkyl radicals are representative of those which may be present in the ethoxylated alcohol: the straight or branched groups such as octyl, nonyl, decyl, dodecyl, tetradecyl, pentadecyl, hexadecyl, octodecyl, eicosyl, heneicosyl, docosyl, tricosyl, tetracosyl, and the like, and the cyclic groups such as cyclooctyl, ethylcycloehxyl, ethylcyclooctyl, 1,1,2-trimethylcycloheptyl, 1,4-dimethylcyclohexyl, and the like. Exemplary of some of the ethoxylated alcohols that are commercially available and which are defined by the above formulae are the "Igelpals" produced by General Aniline and Film Corporation, e.g., octylphenoxypoly(ethyleneoxy)ethanols, nonylphenoxy(ethyleneoxy)ethanols, dioctylphenoxypoly(ethyleneoxy)ethanols, dinonylphenoxypoly(ethyleneoxy)ethanols, dodecylphenoxypoly(ethyleneoxy)ethanols, tridecyloxypoly(ethyleneoxy)ethanols, and the like. For preparation of latices which are particularly effective as thickening agents it has been found that the dialkylphenoxypoly(ethyleneoxy)ethanols such as the dioctyl- and dinonyl-phenoxypoly(ethyleneoxy)ethanols containing from 15 to 30 miles of ethylene oxide are preferred.

The esterification reaction may be conducted in a solvent medium or in bulk. Suitable solvents include ketones such as methylethyl ketone, aliphatic hydrocarbons such as hexane, and aromatic hydrocarbons such as benzene or toluene. Because the solvents are often difficult to remove from the ester products, the bulk type reaction is preferred. This reaction usually is conducted at temperatures of from about 40 to about 80° C. for periods of from about 30 minutes to about two hours. In order to obtain a partial ester product which is preferred for the purposes of this invention, the anhydride and the ethoxylated alcohol are reacted in a 1:1 molar ratio. It will be appreciated, however, that molar ratios of the anhydride to the ethoxylated alcohol up to and including 1:2 may also be used.

The amount of ester contained in the monomeric material may be varied considerably depending upon the intended application of the resulting latex. Usually from about 3 to about 20 percent by weight of the ester is used for preparing latices that are to be used as thickening agents; whereas greater amounts may be used, that is, up to about 35 percent by weight of the total monomeric material for the preparation of latices used as dispersing agents.

In order to prepare the acid latices of this invention the monomeric material must also contain additional monomers which are ethylenically unsaturated compounds. The preferred monomers are butadiene and styrene or mixtures thereof. In general from at least about 35 to about 77 percent by weight of the monomeric material may comprise either one or both of these preferred monomers; the total weight percent of these monomers comprising the balance of the monomeric material used. Preferably, about equal amounts of styrene and butadiene are used in combination for preparation of thickening agents having particular high thickening efficiency.

It will be appreciated that minor amounts of other ethylenically unsaturated monomers may also be used in place of the additional preferred monomers. These additional monomers include the lower alkyl esters of acrylic and methacrylic acid such as methylacrylate and methyl methacrylate, the nitriles such as acrylonitrile, the dienes such as isoprene, methylolacrylamide and the like. It will be understood that either styrene or butadiene or both must be present in the noted proportions within the monomeric material in order to impart the necessary stability to the resulting latex and also to produce a latex having the desired stabilization and/or thickening properties.

Polymerization of the monomeric material is effected in an aqueous system or medium containing at least one emulsifier and is catalyzed with a compound or a mixture of compounds yielding free radicals with or without a mercaptan modifier. The catalyst may be any one of the free-radical yielding initiators such as the inorganic persulfates, percarbonates, perborates, and the like, e.g., potassium persulfate, ammonium persulfate, or sodium persulfate; organic peroxides, e.g., benzoyl peroxide, acetyl peroxide, or di-t-butyl peroxide; and organic hydroperoxides such as diisopropylbenzene hydroperoxide and the like which are usually employed in free radical type polymerization systems. Preferably the inorganic persulfates such as potassium persulfate are employed as catalysts because of their water solubility, stability, and low cost. Redox systems of initiation may also be employed utilizing the above noted initiators with suitable reducing agents known in the polymerization art. The amount of catalyst used is usually determined by the size of the reactor and may range from about 0.02 to 0.3 part by weight per 100 parts of the monomeric material. The temperature range used to promote the reaction may vary from about 0 to 90° C. and preferably is in the range of from about 50° to 65° C. It will be understood that the pressure in the reactor used to effect polymerization will depend upon the vapor pressures of the monomers used and the temperatures required to obtain acceptable rates of polymerization with the selected catalyst. Generally the pressure may vary from about atmospheric to about 100 pounds per square inch gauge. Preferably pressures of from 25 to 50 pounds per square inch gauge are used. It will be appreciated that in some cases, e.g., when butadiene is not present, the pressure may be maintained by use of an inert gas, e.g., nitrogen, $CO_2$ and the like.

The amount of water in the aqueous polymerization system may vary from about 120 to about 300 parts per 100 parts of monomeric material (on a weight basis).

It has been found that best polymerization results (i.e., no measurable prefloc) are obtained at fairly high water levels, that is, from about 200 to 250 parts per 100 parts of monomeric material. In general, the use of lower water levels should have lower emulsifier levels in the initial charge.

Particularly effective emulsifiers for the emulsion polymerization of the monomeric material used to prepare the acid latices are anionic emulsifiers, i.e., ethoxylated fatty alcohol sulfates. Those alcohols containing 12 to 16 carbon atoms and from 2 to 5 moles of ethylene oxide and those which are neutralized with either sodium or ammonia are preferred. A minimum of 2 parts by weight per 100 parts by weight of monomeric charge of these emulsifiers are required for satisfactory polymerization stability. Usually from about 2 to about 5 parts by weight per 100 parts by weight of the monomer charge are used. It will be understood that other nonionic emulsifiers of the water soluble type can be used in conjunction with the ethoxylated alcohol sulfates, e.g., octylphenoxypoly(ethyleneoxy)ethanol. Exemplary of the preferred emulsifiers are the sodium and ammonium salts of sulfated nonylphenoxypoly(ethyleneoxy)ethanol.

The polymerization system may also contain small amounts of the sulfhydryl-group containing compounds known as "modifiers" in the synthetic rubber art such as the alkyl mercaptans containing from about 8 to 22 carbon atoms, e.g., n-octyl mercaptan, n-dodecyl mercaptan or tert-dodecyl mercaptan, and commercially available mixed tertiary mercaptans containing from 12 to 16 carbon atoms, thiophenyl, alpha- or beta-thionaphthol and the like.

In accordance with this invention it has been found that when using the mercaptan modifiers such as tert-dodecyl mercaptan the amount of modifier should be kept to a minimum for preparation of acid latices suitable for use as thickening agents. Substantially no improvement in the thickening efficiency has been observed when less than 0.05 part by weight of the mercaptan modifier is used. However, when more than about 0.5 part of the mercaptan modifier per 100 parts by weight of monomeric material is used the thickening efficiency of the resulting latex is reduced. It will be also appreciated that the specific amount of modifiers used is dependent on the activity of the modifier as well as the monomers employed.

When preparing acid latices suitable for use as emulsifiers, it is desirable to keep the molecular weight of the polymer as low as possible. Accordingly, the mercaptan level must be relatively high. Up to about 2.0 parts of the mercaptan modifier per 100 parts of the monomeric material will cause rather drastic reduction of the solution viscosity but above 2.0 parts the change is much less noticeable. Thus, it will be understood that depending upon the application of the latex being prepared the mercaptan modifier level may be varied from about 0 to 3 parts per 100 parts of monomeric material.

It will be appreciated that various other polymerization aids may also be employed. For example, a chelating agent such as ethylenediaminetetraacetic acid may be used to tie up any free iron or other divalent metals that may interfere with the polymerization reaction. Usually from about 0.01 the 0.1 part of the chelating agent per 100 parts of monomeric material are employed.

In neutralizing the acid latices which are employed as thickening agents or as emulsifiers, the acid latex (emulsion) resulting from the polymerization reaction may initially be treated with an aqueous solution of an alkaline material to effect neutralization of the carboxyl groups of the polymer to form

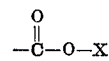

groups where X is the cation of the alkaline material. Depending on whether the latex is to be used as in situ thickening agent or as an emulsifier (or as a thickening agent having a high viscosity), the pH of the acid latex may be adjusted after the acid latex has been admixed with the aqueous system to be thickened or before addition to the aqueous system. Also it will be appreciated that a dilute concentration of the acid latex may be added directly to a latex having an alkaline pH during continuous agitation.

Thus, this invention is also directed to a unique method of thickening aqueous systems which comprises adding the acid latex of the heretofore described methacrylic acid copolymers in amounts from about 0.2 to about 2.0 percent by weight to an aqueous system and thereafter adjusting the alkalinity of the system to a pH of from about 8 to about 10 to cause an increase in the viscosity of the aqueous system.

It will be understood that in thickening an aqueous system in accordance with this invention any desired amount of the acid latex may be employed which will effect the desired thickening effect. Thus, the upper limit of the amount of acid latex used is primarily determined by the efficiency of the thickener or stabilizer utilized. As heretofore described, however, the unique advantages of the acid latices of this invention are found in their high thickening efficiency and consequently the relatively small amounts thereof which may be employed. Thus, it has been found that from about 0.2 to about 2.0 percent by weight of the thickening agent based on the weight of the aqueous system to be thickened advantageously thickens the aqueous system to a desired viscosity. When used as a dispersing agent it has been found that considerably larger amounts of the neutralized acid latices are required. Usually from about 20 to 50 percent by weight of the salt of the acid latex based on the dry weight of the solids to be dispersed in the aqueous system are required.

It will be understood that dilute dispersions of the acid latices of this invention suitable as thickening agents become extremely viscous when neutralized with a basic material. When added to an aqueous system thickening can occur from free or added alkalinity. As an in situ thickening agent the latex may be added to an acidic latex with no apparent thickening occurring until the pH of the system is raised to a pH of at least about 8.0. As heretofore noted, this in situ thickening limits the need for handling viscous materials to enhance the viscosity of aqueous systems in many different applications.

The acid latex produced by polymerization in the aqueous emulsion will have a polymeric solids content that may vary from about 25 to 45 percent by weight of the total latex product. In accordance with this invention it has been found that when used as an already thickened thickener dilute salts containing from 1 to 3 percent by weight of polymeric solids should be prepared by first diluting the acid latex with water to the desired solids level (i.e., 1 to 3 percent by weight). Thereafter the latex is agitated and the desired base at a 15 to 20 percent concentration in water is slowly added until the resulting solution clears. This clear solution can then be used as a thickening agent for various applications. When used as an in situ thickener for thickening of an acid or neutral system, the acid latex may be added to an aqueous system at the solids content produced during the polymerization reaction, that is, from 25 to 45 percent. Thereafter, the pH of the aqueous system is adjusted to a more alkaline pH, that is, from about 8 to 10. Preferably the pH is adjusted to a range of from 9 to 9.5 to obtain optimum thickening efficiency. When added to an alkaline system in relatively small amounts, the acid latex thickener is preferably diluted to a solids content of about 10 to 15 percent before addition.

Various alkaline materials may be used to adjust the pH of the acid latices. Preferably the alkaline materials are added in dilute concentration of from about 5 to 25 percent by weight of the solution in order to prevent a localized hydrolysis or neutralization which may occur because of insufficient agitation and which results in severe gel formation. It will be understood that the term "gel" refers to polymeric materials which conglomerate and tend to separate from an aqueous system. Among the alkaline materials which are suitable for adjusting the pH of the acid latices are sodium hydroxide, potassium hydroxide, lithium hydroxide, ammonium hydroxide, ethanolamine, morpholine, diethanol amine, and the like. Other alkaline materials may be used but that it is much preferred to use those inorganic materials which have monovalent cations since it has been found that high concentrations of multivalent cations tend to cause the acid latices of this invention to destabilize and precipitate.

The latices, that is, the aqueous dispersions of the water-insoluble polymers, which can be treated with the anionic thickeners of this invention should be acid or substantially neutral in order to use the acid latices of this invention as in situ thickening agents. These latices may contain emulsifiers of the anionic of non-ionic types. Suitable anionic emulsifiers that may be present include the higher fatty alcohol sulfates such as the sodium or potassium salts of the sulfates of alcohols having from 8 to 18 carbon atoms such as lauryl alcohol, alkali metal salts or amine salts of higher fatty acids, such as those of fatty acids having from 8 to 18 carbon atoms with sodium, potassium, or any of the ethanolamines, such as tri-ethanol-amine, examples, of which include triethanolamine oleate or stearate, sulfonated compounds such as turkey red oil or sulfonated ricinoleic acid, and sulfonated alkyl-aryl compounds, such as sodium tert-octyl benzene sulfonate and sodium tert-octylphenol sulfonate. Examples of non-ionic emulsifiers include alkylphenoxypolyethoxyethanols having alkyl groups of about 7 to 18 carbon atoms and about 9 to 30, or more, oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkyl thiophenols having alkyl groups of 6 to 15 carbon atoms; ethylene oxide derivatives of long-chained carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols; ethylene oxide derivatives of etherified or esterified polyhydroxy compounds having a hydrophobic hydrocarbon chain, etc.

The polymer salts of the present invention are useful for thickened dispersions of water-insoluble polymers of many different types. Besides natural rubber latex, artificial latices or aqueous dispersions of emulsion polymers of monoethylenically unsaturated vinyl or acrylic monomer types as well as other elastomeric types of polymers may be thickened. Examples of aqueous dispersions that may be thickened include those of copolymers of styrene with butadiene; copolymers of butadiene with or without styrene and the alpha methylene carboxylic acids, and their esters, nitriles and amides, such as acrylic acid, methyl acrylate, methyl methacrylate, acrylonitrile, methacrylonitrile, methacrylamine, and the like; copolymers of butadiene or other dienes with unsaturated polycarboxylic acids, their esters (partial and full), and the like such as itaconic acid, monomethyl itaconic, and the like, homopolymers of styrene, copolymers of 75 to 95 percent vinyl chloride with 5 to 25 percent of vinylidene chloride, acrylonitrile or vinyl acetate, polychloroprene, vinyl acetate homopolymers and copolymers, copolymers of styrene with maleic anhydride, homopolymers and copolymers of acrylic acid esters or methacrylic acid esters, such as those of alcohols having 1 to 8 carbon atoms, also copolymers of the acrylic acid esters of methacrylic acid esters with vinyl chloride, vinyl acetate, acrylonitrile, styrene or the like. The thickening agents of this invention are particularly suitable for thickening latices of carboxylated SBR rubbers, i.e., copolymers of butadiene, styrene and carboxylic acid or partial ester thereof which are also formed in an aqueous acid system by emulsion polymerization, natural rubber latices, polyisoprene latices and acrylic latices.

It will be appreciated that the acid latices of this invention find utility in many different applications where thickening agents or dispersing agents are required. For example, the thickening ability of the acid latex may be used to increase the viscosity of latex containing materials where a high viscosity is necessary for ease of application, e.g., spreading, reduced penetration, and reduced flow properties. For instance, the reduced flow properties would be particularly applicable to insecticides and herbicides where a more viscous aqueous solution would adhere to foilage or other vertical surfaces and not run off as easily thereby increasing the effectiveness of the material. In the area of fire fighting, water thickened with the thickening agents of this invention will have increased viscosity and will therefore cling to vertical surfaces and tend to build up on flat surfaces where its cooling action and smothering properties (that is, exclusion of oxygen-containing gases) can be greatly enhanced. Thus, the substantially water soluble salts of the acid latices are suitable for a variety of applications where water soluble type thickening or dispersing agents are conventionally used.

For example, as an emulsifier or dispersing agent the acid latices of this invention are particularly effective in increasing the mechanical stability of certain latex compositions and in printing ink extenders where it will stabilize a mixture of a solvent (that is, mineral spirits such as Varsol), water, printing ink and a latex binder to provide smooth non-separating free flowing composition with improved printing properties. The latex is also particularly useful as a pigment dispersing agent to impart flow properties to pigment press cakes commonly used in the preparation of printing inks.

It will also be appreciated that the thickening agents of this invention find additional utility in the thickening of aqueous compositions to be applied to textiles such as adhesives, warp sizes, backings for rugs and other pile fabrics, clarification of raw water, such as the saline water used in the recovery of oil from exhausted oil wells by water-flooding techniques, preparation of drilling muds, thickening of cosmetics and the like.

The following specific examples are illustrative of the invention, with the parts and proportions designated therein (as set forth in the foregoing description) being by weight unless otherwise indicated.

EXAMPLE I

In this example, an ester of an ethoxylated alcohol is produced by charging a reactor with 93.4 parts of a dinonylphenoxypoly(ethyleneoxy)ethanol containing 24 moles of ethylene oxide. Thereafter 6.6 parts by weight of maleic anhydride and 0.01 part of monomethylether of hydroquinone (MEHQ), a polymerization inhibitor, were charged to the reactor. The reactor was closed and swept with nitrogen gas. Then the contents of the reactor were heated to 140° F. and held at that temperature for one hour to obtain a conversion of about 100 percent. Thereafter, the resulting ester product was cooled and discharged from the reactor.

EXAMPLE II

An aqueous dispersion, i.e., a latex of a butadiene/styrene/methacrylic acid/half ester of ethoxylated alcohol (the one prepared in Example I) was prepared by emulsion polymerization at a temperature of 131° F. in a reactor in accordance with the following recipe:

Ingredients: Parts by weight
- Butadiene (Bd) _____ 15
- Styrene (St) _____ 20
- Methacrylic acid (MAA) _____ 50
- Ester of ethoxylated alcohol (HEE) _____ 15
- Distilled water _____ 200
- Ammonium salt of a $C_{12}$ ethoxylated alcohol _ 4
- Ethylenediaminetetraacetic acid _____ 0.05
- Tert-dodecyl mercaptan _____ 0.1
- Potassium persulfate _____ 0.075

The reaction was continued for 7 hours to obtain a conversion of about 95 percent. The resulting latex was stripped to remove any unreacted monomers to a 35 to 36 percent solids level.

The typical properties of this latex are as follows:

- Appearance _____ Milky liquid.
- pH _____ 4±1.
- Specific gravity at 25° C. _____ 1.04.
- Density at 25° C. _____ 8.60 lbs./gal.
- Viscosity at 25° C. _____ 30 cps.[1]

[1] Brookfield viscosity with No. 2 spindle at 20 r.p.m., Model RVT.

EXAMPLE III

The following data show the effect of neutralization on the acid latex produced in Example II; the latex being adjusted to a pH range of 9 to 9.3.

TABLE 1

| Thickener conc., percent | Base | Brookfield viscosity, cps.[1] at— | | |
|---|---|---|---|---|
| | | 5 r.p.m. | 10 r.p.m. | 20 r.p.m. |
| 1 | Ammonium hydroxide | 19,000 | 14,000 | 11,900 |
| 1 | Sodium hydroxide | 7,700 | 7,000 | 6,000 |
| 3 | Ammonium hydroxide | 249,000 | 220,000 | 176,000 |
| 3 | Sodium hydroxide | 216,000 | 190,000 | 165,000 |

[1] Viscosity obtained by Brookfield RVT Viscosimeter with No. 7 spindle.

EXAMPLE IV

A series of experiments were conducted to compare the use of the acid latex produced by Example II as in situ thickener with known polymeric acrylic thickeners, i.e., Acrysol ASE-60, ASE-70, or ASE-95 sold by Rohm and Haas Company. In each experiment different latices were thickened by adjusting each latex to a pH of 9 to 9.3 if necessary and by adding the thickeners to the alkaline latex until a viscosity of 7,000 to 7,500 cps. was obtained. The amount of thickener used is expressed in dry parts per 100 dry parts of latex.

As shown in the following data the thickener of this invention consistently provides comparable or greater thickening efficiency than the known thickeners.

TABLE 2

| Latex evaluated | Percent solids | Dry parts (phr.) thickener | |
|---|---|---|---|
| | | Acrylic latex [1] | Acid latex [2] |
| Natural | 62 | 0.77 | 0.105 |
| Neoprene | 30.5 | 1.48 | 0.28 |
| Acrylic [3] | 45 | 0.59 | 0.56 |
| Acrylic [4] | 45 | 0.26 | 0.55 |
| Butadiene-styrene [5] | 41.7 | 1.96 | 0.54 |

[1] Acrysol ASE-60, a polyacrylic thickener.
[2] The thickener latex produced in Example II at 35% solids.
[3] Rohn & Haas HA-16.
[4] Rohm & Haas E-32.
[5] Naugatuck 2000.

The following tabular data further illustrate the viscosities obtained in additional experiments wherein the acid latex of the invention produced in Example II was compared to known acrylic thickeners.

TABLE 3

Natural latex (62%):
200 dry grams.
321 wet grams.
No pH adjustment necessary (i.e. its pH was 10–10.5)

Thickeners (parts added per 100 parts of latex solids):

| | | | | |
|---|---|---|---|---|
| Acrylic latex [1] | 5.5 | | | |
| Do [2] | | 6.0 | | |
| Do [3] | | | 7.5 | |
| Acid latex | | | | 0.6 |
| Viscosity (cps., Brookfield Model RVT): | | | | |
| Initial | 8,100 | 7,400 | 8,300 | 8,300 |
| 3 day BS [4] | 9,100 | 7,300 | 9,000 | 11,100 |
| 3 day AS [5] | 9,450 | 7,000 | 8,500 | 9,500 |
| 8 day BS | 11,400 | 8,800 | 9,800 | 13,200 |
| 8 day AS | 12,000 | 8,200 | 9,600 | 11,000 |
| 16 day BS | 20,000 | 11,200 | 12,600 | 25,500 |
| 16 day AS | 21,000 | 12,500 | 14,500 | 19,500 |

[1] Acrysol ASE-60, Product of Rohm & Haas Company.
[2] Acrysol ASE-75, Product of Rohm & Haas Company.
[3] Acrysol ASE-90, Product of Rohm & Haas Company.
[4] Before stirring.
[5] After stirring.

TABLE 4

Neoprene latex:
150 dry grams.
493 wet grams.
No pH adjustment necessary (i.l., its pH was 9–10)

Thickeners:

| | | | | |
|---|---|---|---|---|
| Acrylic latex [1] | 9.0 | | | |
| Do [2] | | 6.0 | | |
| Do [3] | | | 12.0 | |
| Acid latex | | | | 1.2 |
| Viscosity: | | | | |
| Initial | 7,800 | 7,000 | 7,000 | 7,700 |
| 1 day BS [4] | 8,150 | 5,600 | 10,200 | 9,100 |
| 1 day AS [5] | 8,600 | 5,750 | 7,400 | 8,300 |
| 3 day BS | 8,300 | 5,450 | 9,600 | 10,000 |
| 3 day AS | 8,750 | 5,750 | 8,000 | 9,100 |
| 5 day BS | 9,000 | 6,000 | 9,100 | 10,300 |
| 5 day AS | 10,500 | 6,250 | 9,400 | 10,000 |

[1] Acrysol ASE-60, Product of Rohm & Haas Company.
[2] Acrysol ASE-75, Product of Rohm & Haas Company.
[3] Acrysol ASE-90, Product of Rohm & Haas Company.
[4] Before stirring.
[5] After stirring.

TABLE 5

Rohm & Haas HA-16 (acrylic latex):
200 dry grams.
445 wet grams.
pH raised to 9.0 with $NH_4OH$ Thickeners, g.:

| | | | | |
|---|---|---|---|---|
| Acrylic latex [1] | 4.2 | | | |
| Do [2] | | 5.7 | | |
| Do [3] | | | 7.7 | |
| Acid latex | | | | 3.2 |
| Viscosity: | | | | |
| Initial | 7,500 | 7,200 | 7,100 | 7,200 |
| 1 day BS [4] | 7,000 | 6,500 | 7,350 | 6,600 |
| 1 day AS [5] | 7,100 | 6,550 | 7,400 | 6,800 |
| 3 day BS | 7,100 | 6,600 | 7,600 | 6,500 |
| 3 day AS | 7,500 | 6,900 | 7,650 | 6,800 |
| 5 day BS | 7,150 | 6,900 | 7,700 | 6,100 |
| 5 day AS | 7,450 | 6,900 | 7,850 | 6,150 |
| 4 week BS | 7,400 | 9,200 | 8,850 | 4,750 |
| 4 week AS | 9,200 | 9,950 | 10,900 | 6,100 |

[1] Acrysol ASE-60, Product of Rohm & Haas Company.
[2] Acrysol ASE-75, Product of Rohm & Haas Company.
[3] Acrysol ASE-90, Product of Rohm & Haas Company.
[4] Before stirring.
[5] After stirring.

EXAMPLE V

A series of additional latices were prepared by following the procedures and using a recipe similar to the one disclosed in Example II except that the ratio of monomers was changed. The acid latices then were evaluated as in situ thickeners for polymeric dispersions and for water. In the following experimental runs the latices obtained were each stripped to a solids content of about 35 percent by weight. Some were used to thicken natural or synthetic latex by adding a small amount of an acid latex and then adjusting the pH of the latex to be thickened to a pH of 9.0 to 10. Others were diluted to a solids content of 0.75 percent by weight in water and then adjusted to a pH of 9.5.

TABLE 6

Viscosities obtained by utilizing 0.2 parts of the thickener (35% solids) per 100 parts of latex to thicken a natural latex (50% solids)

| Run No. | Monomers | Ratio of monomers | Viscosity, cps.[2] |
|---|---|---|---|
| 1 | Bd/MAA/HEE | 35/50/15 | 8,050 |
| 2 | Bd/St/MAA/HEE | 30/5/50/15 | 4,400 |
| 3 | Bd/St/MAA/HEE | 25/10/50/15 | 5,000 |
| 4 | Bd/St/MAA/HEE | 20/15/50/15 | 22,500 |
| 5 | Bd/St/MAA/HEE | 15/20/50/15 | 42,000 |
| 6 | Bd/St/MAA/HEE | 10/25/50/15 | 26,500 |
| 7 | Bd/St/MAA/HEE | 5/30/50/15 | 24,000 |
| 8 | St/MAA/HEE | 35/50/15 | 18,000 |
| Control [2] | | | 20 |

[1] Brookfield viscosity at 12 r.p.m.
[2] Viscosity without thickener.

TABLE 7

Viscosities obtained by diluting latex thickening agent to a solids content of 0.75 in distilled water or by adding 0.35% based on total weight of the polymeric solids in a carboxylated SBR[1] latex

| Run No. | Monomers | Ratio of monomers | Viscosity of thickened water, cps.[2] | Viscosity, cps.[2] |
|---|---|---|---|---|
| 1 | Bd/MAA/HEE | 35/50/15 | 2,250 | 16,000 |
| 2 | Bd/St/MAA/HEE | 30/5/50/15 | 150 | 1,650 |
| 3 | Bd/St/MAA/HEE | 25/10/50/15 | 6,500 | 24,000 |
| 4 | Bd/St/MAA/HEE | 20/15/50/15 | 10,000 | 25,500 |
| 5 | Bd/St/MAA/HEE | 15/20/50/15 | 32,500 | 29,500 |
| 6 | Bd/St/MAA/HEE | 10/25/50/15 | 21,500 | 18,000 |
| 7 | Bd/St/MAA/HEE | 7.5/27.5/50/15 | 7,000 | 26,500 |
| 8 | Bd/St/MAA/HEE | 5/30/50/15 | 10,000 | 23,500 |
| 9 | Bd/St/MAA/HEE | 3/32/50/15 | 2,100 | 22,500 |
| 10 | Bd/St/MAA/HEE | 2/33/50/15 | 1,350 | 48,000 |
| 11 | Bd/St/MAA/HEE | 1/34/50/15 | 650 | 32,500 |
| 12 | St/MAA/HEE | 35/50/15 | 450 | 20,500 |

[1] 35 Bd/63 St/2 itaconic acid, 50 cps.
[2] Brookfield viscosity at 20 r.p.m.

It will be observed that the acid latices of this invention which contain about equal amounts of butadiene and styrene in the polymer chain provide thickeners having the greater thickening efficiency.

TABLE 8

Changes in viscosities caused by reducing the amount of the ester of the ethoxylated alcohol employed in preparing the acid latices used as thickening agents (0.35% by weight) for a carboxylated SBR rubber[1] and for water (0.75% by weight)

| Run No. | Monomers | Ratio of monomers | Viscosity of latex, cps.[2] | Viscosity of distilled water, cps.[2] |
|---|---|---|---|---|
| 1 | Bd/St/MAA/HEE | 15/20/50/15 | 32,000 | 6,600 |
| 2 | Bd/St/MAA/HEE | 20/20/50/10 | 14,000 | 2,750 |
| 3 | Bd/St/MAA/HEE | 20/25/50/5 | 11,500 | 1,300 |
| 4 | Bd/St/MAA/HEE | 5/30/50/15 | 50,000 | 520 |
| 5 | Bd/St/MAA/HEE | 2/33/50/15 | 48,000 | 160 |
| 6 | Bd/St/MAA/HEE | 1/34/50/15 | 50,000 | 120 |
| 7 | St/MAA/HEE | 35/50/15 | 52,000 | 100 |
| Control [3] | | | 50 | 0 |

[1] Same latex as in Table 7.
[2] Brookfield viscosity at 12 r.p.m.
[3] Without thickener.

From the data in Table 8 above it will be seen that the amount of ester of the ethoxylated alcohol used to prepare the acid latices has a particularly pronounced effect on the viscosity of the latex thickened with the acid latex. Thus, it will be appreciated that the acid latices of the invention preferably are tailored for each intended application in order to obtain the desired high thickening efficiency.

TABLE 9

Effects of reducing both the amounts of methacrylic acid and ester of ethoxylated alcohol in preparation of acid latices used as thickening agents for a carboxylated SBR

| Run No. | Monomers | Ratio of monomers | Viscosity of latex, cps.[1] |
|---|---|---|---|
| 1 | BD/St/MAA/HEE | 15/20/50/15 | 28,000 |
| 2 | Bd/St/MAA/HEE | 17.5/22.5/50/10 | 2,650 |
| 3 | Bd/St/MAA/HEE | 20/25/50/5 | 12,000 |
| 4 | Bd/St/MAA/HEE | 17.5/22.5/45/15 | 2,000 |
| 5 | Bd/St/MAA/HEE | 20/25/45/10 | 400 |
| 6 | Bd/St/MAA/HEE | 22.5/27.5/45/5 | 1,800 |
| 7 | Bd/St/MAA/HEE | 20/25/40/15 | 300 |
| 8 | Bd/St/MAA/HEE | 22.5/27.5/40/10 | 550 |
| 9 | Bd/St/MAA/HEE | 25/30/40/5 | 400 |
| Control [2] | | | 50 |

[1] Brookfield Model RVT.
[2] Without thickener.

From the above data it will be recognized that the thickening efficiency obtained by the thickening agents of this invention is determined to a great extent by the amount of methacrylic acid copolymerized within the acid latex and that the thickening efficiency drastically changes when the amount of methacrylic acid is reduced below 45 percent by weight of the monomeric material used to prepare the acid latex.

EXAMPLE VI

In this example an acid latex particularly useful as an emulsifier or dispersing agent was prepared by emulsion polymerization at a temperature of 131° F. in a reactor by using the following recipe:

| Ingredients: | Parts by weight |
|---|---|
| Butadiene (Bd) | 45 |
| Styrene (St) | 10 |
| Methacrylic acid (MAA) | 30 |
| Ester of ethoxylated alcohol (HEE) [ester prepared in Example I] | 15 |
| Distilled water | 200 |
| Ammonium salt of a $C_{12}$ ethoxylated alcohol | 4.0 |
| Ethylenediaminetetraacetic acid | 0.05 |
| Tert-dodecyl mercaptan | 2.0 |
| Potassium persulfate | 0.075 |

The polymerization reaction was conducted until a conversion of 95 percent was obtained. Then the resulting latex was stripped to remove any unreacted monomers to a 35–36% solids content.

EXAMPLE VII

By using polymerization conditions similar to those disclosed in Example VI, several additional acid latices were prepared and evaluated as emulsifiers. The polymerization recipes used were identical to that in Example VI with the exception that the ratio of monomers and the mercaptan level were varied. As shown in the following table those latices prepared with higher amounts of the mercaptan modifier show lower Brookfield viscosities and tend to be more soluble (as indicated by a transparent alkaline solution) and are therefore more suitable as emulsifiers. The additional latices evaluated were diluted to an 8% polymeric solids level and then neutralized to a pH of 9.5 with an ammonium hydroxide solution.

TABLE 10

| Run. No. | Composition | | | | | Brookfield viscosity[1] (60 r.p.m.) | Appearance |
|---|---|---|---|---|---|---|---|
| | Bd | St | MAA | HEE | Sulf. | | |
| 1 | 50 | | 35 | 15 | 0.1 | 8,650 | Cloudy. |
| 2 | 50 | | 35 | 15 | 0.5 | 960 | Opalescent. |
| 3 | 50 | | 35 | 15 | 1.0 | 157 | Transparent. |
| 4 | 55 | | 30 | 15 | 0.5 | 195 | Milky. |
| 5 | 60 | | 25 | 15 | 0.5 | 9.5 | Do. |
| 6 | 55 | | 35 | 10 | 0.3 | 1,410 | Cloudy. |
| 7 | 60 | | 35 | 5 | 0.5 | 940 | Do. |
| 8 | 50 | 10 | 25 | 5 | 0.5 | 7.5 | White. |
| 9 | 65 | | 35 | | 0.1 | 6,500 | Cloudy. |
| 10 | 65 | | 35 | | 0.5 | 2,650 | Do. |
| 11 | 65 | | 35 | | 1.0 | 40.5 | Milky. |
| 12 [2] | 45 | 10 | 30 | 15 | 2.0 | [3] 200 | Transparent. |

[1] Brookfield viscosimeter Model RVT.
[2] Latex prepared in Example VI.
[3] This latex was diluted to a solids content of 20%.

EXAMPLE VIII

This example further illustrates the utility of the acid latex of this invention as a thickener having emulsifying properties and as a dispersing agent. A printing paste containing an extender, a printing ink, and a latex binder was prepared by using the following extender, ink, and paste recipes:

TABLE 11 printing extender

| Ingredients: | Wet parts by weight |
|---|---|
| Water | 47.5 |
| Acid latex thickener [1] | 1.5 |
| Ammonium hydroxide, 28% | 1.0 |
| Varsol No. 2 (mineral spirits) | 50.0 |
| | 100.0 |

[1] Latex produced in Example II.

(Ingredients added in order listed and blended with high speed agitation.)

Printing ink

| Ingredients: | Wet parts by weight |
|---|---|
| Phthalocyanine Blue press cake (150 parts dry) | 55.0 |
| Ammonium oleate | 3.8 |
| Ammonium salt of acid latex at 25% solids [1] | 15.0 |
| Butylated melamine formaldehyde resin | 5.0 |
| Varsol No. 2 | 10.0 |
| Water | 11.2 |
| | 100.0 |

[1] Latex produced in Example VI at pH of 9.5.

(Ingredients added in order listed and blended with high speed agitation.)

Printing paste (for dark shade)

| Ingredients: | Wet parts by weight |
|---|---|
| Printing extender | 60.0 |
| Printing ink | 20.0 |
| Carboxylated NBR [1] | 20.0 |
| | 100.0 |

[1] A carboxylated acrylonitrile rubber containing an anionic emulsifier.

This printing paste and a conventional printing paste prepared with sodium lauryl sulfate and methyl cellulose were used in a roller type printing machine to print samples of 80 x 80 cotton print cloth. The samples were cured for 3 minutes at 150° C. in an oven and then conditioned for 24 hours at 70° F. at a constant humidity. Evaluation of the samples showed that the printing paste prepared with the acid latices of this invention gave superior wet crock resistance compared to the conventional printing paste.

EXAMPLE IX

The unique ability of the thickeners of this invention to increase greatly the viscosity of water is further shown by this example. The acid latex produced in Example II was compared with two known thickeners, i.e., an acrylic latex known as Acrysol ASE-60, and a solid resin of a high molecular weight acid polymer known as Carbopol 934. Each thickener was used in increasing concentrations to thickened water by adding a given amount of the thickener to water with agitation and by adjusting the pH of the water to 9.5 with ammonium hydroxide. Viscosities of the thickened water were obtained with a Brookfield viscosimeter Model RVT.

TABLE 12

Solid acid resin [1]

| Percent by weight of thickener: | Viscosity (cps.) |
|---|---|
| 0.5 | 48,500 |
| 1.0 | 125,000 |
| 1.5 | 150,000 |
| 2.0 | 170,000 |
| 2.5 | 180,000 |

[1] Carbopol 934, a product of B. F. Goodrich Co.

Acrylic latex [1]

| Percent by weight of thickener: | Viscosity (cps.) |
|---|---|
| 1.0 | 400 |
| 2.0 | 2,000 |
| 3.0 | 8,000 |
| 4.0 | 23,500 |
| 5.0 | 30,000 |

Acid latex [1]

[1] Acrysol ASE-60, a product of Rohm & Haas Company.

| Percent by weight of thickener: | Viscosity (cps.) |
|---|---|
| 0.5 | 2,000 |
| 1.0 | 78,000 |
| 1.5 | 220,000 |
| 2.0 | 280,000 |

[1] Latex produced in Example II.

From the above viscosity data it will be seen that the thickeners of this invention provide outstanding high thickening efficiency for water and water-containing systems. At equal concentrations, these thickeners are consistently more efficient than the acrylic latex thickener and at higher concentrations of 1.5% by weight they also provide greater viscosities than the acid resin.

EXAMPLE X

This example further illustrates the effectiveness of the acid latices as water gellants or thickeners and also points out the criticality of the amount of half ester used to prepare the acid latex. By following the polymerization techniques and conditions described in Example II, several polymerizations were conducted in which the amount of the ester (i.e., the ester produced in Example I) was varied from 0 to 15 parts per 100 parts of the monomer charge. The resulting latices were then evaluated as water thickeners in a 1% solution at a pH of 9.5 adjusted with ammonium hydroxide. As shown in the following data, the acid latex containing 3 parts of the ester per 100 parts of the monomeric material provides almost twice the viscosity obtained without the ester and about 1½ times the viscosity obtained with latex containing 2 parts of the ester.

TABLE 13

| Run No. | Composition | | | | Viscosity, cps. at 100 r.p.m. [1] |
|---|---|---|---|---|---|
| | Bd | St | MAA | HEE | |
| 1 | 25 | 25 | 50 | | 1,800 |
| 2 | 25 | 24.5 | 50 | 0.5 | 2,200 |
| 3 | 25 | 24 | 50 | 1 | 2,150 |
| 4 | 24 | 24 | 50 | 2 | 2,300 |
| 5 | 24 | 23 | 50 | 3 | 3,400 |
| 6 | 23 | 22 | 50 | 5 | 4,900 |
| 7 | 20 | 20 | 50 | 10 | 12,000 |
| 8 | 15 | 20 | 50 | 15 | 16,000 |

[1] Brookfield viscosimeter Model RVT.

EXAMPLE XI

Additional in situ thickeners were prepared by using the polymerization conditions and recipe described in Example II with the exception that other esters of maleic anhydride and an ethoxylated alcohol containing different levels of ethyleneoxy units (EO) were used. (The ester was prepared by the method shown in Example I.) These latices were then evaluated as in situ thickeners in a concentration of 0.35 phr. for the carboxylated SBR latex used in Example V and in a concentration of 0.75% by weight for distilled water.

As shown in the following data various esters may be employed to produce effective thickeners for the purposes of this invention.

TABLE 14

| Run No. | Maleic anhydride ester[1] of— | Latex viscosity,[2] cps. | Water viscosity, cps. |
|---|---|---|---|
| 1 | Dinonylphenoxypoly(ethyl-eneoxy) ethanol (w/24EO). | 27,500 | |
| 2 | Dinonylphenoxypoly(ethyl-eneoxy) ethanol (w/24EO). | 22,000 | 16,500 |
| 3 | Dodecylphenoxypoly(ethyl-eneoxy) ethanol (w/7EO). | 15,000 | 3,750 |
| 4 | Nonylphenoxypoly(ethyl-eneoxy) ethanol (w/9EO). | 25,000 | 2,425 |
| 5 | Dodecylphenoxypoly(ethyl-eneoxy) ethanol (w/10EO). | 23,000 | 13,500 |

[1] Basic recipe: Bd/St/MAA/Ester, 15/20/50/15.
[2] Brookfield viscosimeter Model RVT.

What is claimed is:

1. A stable latex composition which comprises an aqueous dispersion of a copolymer prepared in an acid aqueous medium by emulsion polymerization of monomeric material containing from about 20 to about 55 percent by weight of methacrylic acid; from about 3 to about 35 percent by weight of an ester of an ethylenically unsaturated carboxylic acid anhydride of a polycarboxylic acid containing from 4 to 8 carbon atoms and an ethoxylated alcohol selected from the group consisting of the following formulae:

$$R—O—(CH_2—CH_2O)_n—CH_2CH_2OH$$
and

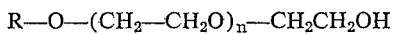
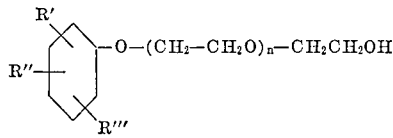

wherein R and R' are alkyl radicals containing from 8 to 24 carbon atoms, R" and R'" are hydrogen or the alkyl radicals represented by R and R', and $n$ represents the degree of oxyethylation of the alcohol which ranges from about 6 to about 150 moles of ethylene oxide in the alcohol; and the balance consisting essentially of at least about 35 percent by weight of a comonomer selected from the group consisting of styrene, butadiene, or mixtures thereof.

2. The stable latex composition of claim 1 as a polymeric dispersing agent which comprises an alkaline aqueous dispersion of a copolymer prepared in an acid aqueous medium by emulsion polymerization of monomeric material containing from about 20 up to less than about 40 percent by weight of methacrylic acid; from about 10 to about 35 percent by weight of an ester of an ethylenically unsaturated carboxylic acid anhydride of a polycarboxylic acid containing from 4 to 8 carbon atoms and an ethoxylated alcohol selected from the group consisting of the following formulae:

$$R—O—(CH_2—CH_2O)_n—CH_2CH_2OH$$
and

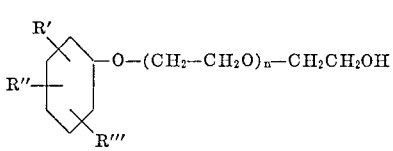

wherein R and R' are alkyl radicals containing from 8 to 24 carbon atoms, R" and R'" are hydrogen or the alkyl radicals represented by R and R', and $n$ represents the degree of oxyethylation of the alcohol which ranges from about 6 to about 150 moles of ethylene oxide in the alcohol; and the balance consisting essentially of at least about 35 percent by weight of a comonomer selected from the group consisting of styrene, butadiene, or mixtures thereof.

3. The stable latex composition of claim 1 as an in situ thickening agent which comprises an acid aqueous dispersion of a copolymer prepared in an acid aqueous medium by emulsion polymerization of monomeric material containing from about 40 to about 55 percent by weight of an ester of an ethylenically unsaturated carboxylic acid anhydride of a polycarboxylic acid containing from 4 to 8 carbon atoms, and an ethoxylated alcohol selected from the group consisting of the following formulae:

$$R—O—(CH_2—CH_2O)_n—CH_2CH_2OH$$
and

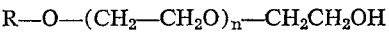
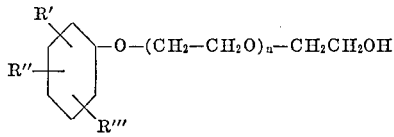

wherein R and R' are alkyl radicals containing from 8 to 24 carbon atoms, R" and R'" are hydrogen or the alkyl radicals represented by R and R', and $n$ represents the degree of oxyethylation of the alcohol which ranges from about 6 to about 150 moles of ethylene oxide in the alcohol; and the balance consisting essentially of at least about 35 percent by weight of a comonomer selected from the group consisting of styrene, butadiene, or mixtures thereof.

4. The latex composition of claim 1 in which the ester is formed by reaction of the anhydride and the ethoxylated alcohol in a molar ratio of anhydride to alcohol that ranges from about 1:1 to about 1:2.

5. The latex composition of claim 4 in which the anhydride is maleic anhydride and the ethoxylated alcohol is selected from the group consisting of a monoalkylphenoxypoly(ethyleneoxy) ethanol and a dialkylphenoxypoly(ethyleneoxy) ethanol and the molar ratio of anhydride to alcohol is about 1:1.

6. The latex composition of claim 5 in which the ethoxylated alcohol is a dinonylphenoxypoly(ethyleneoxy)ethanol containing from about 15 to about 30 moles of ethylene oxide.

7. A method for thickening an aqueous system which comprises adding an in situ thickening agent to said system, said thickening agent comprising an aqueous dispersion of a copolymer prepared by emulsion polymerization of monomeric material containing from about 40 to about 55 percent by weight of methacrylic acid; from about 3 to about 20 percent by weight of an ester of an ethylenically unsaturated carboxylic anhydride of a polycarboxylic acid containing from 4 to 8 carbon atoms and an ethoxylated alcohol selected from the group consisting of the following formulae:

$$R—O—(CH_2—CH_2O)_n—CH_2CH_2OH$$
and

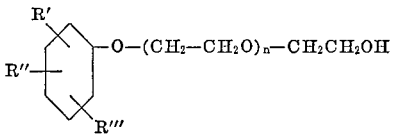

wherein R and R' are alkyl radicals containing from 8 to 24 carbon atoms, R" and R'" are hydrogen or the alkyl radicals represented by R and R', and $n$ represents the degree of oxyethylation of the alcohol which ranges from about 6 to about 150 moles of ethylene oxide in the alcohol; and the balance consisting essentially of at least about 35 percent by weight of styrene, butadiene, or mixtures thereof, and thereafter adding an alkaline material to the aqueous system to adjust the system to a pH of from about 8 to about 10.

8. The method of claim 7 in which the alkaline material is a base selected from the group of inorganic and organic compounds containing monovalent cations consisting of sodium hydroxide, potassium hydroxide, lithium hydroxide, ammonium hydroxide, ethanolamine, morpholine, or diethanolamine.

9. A method for dispersing finely divided solids in an aqueous system which comprises adding an in situ dispersing agent to said system, said dispersing agent comprising an aqueous dispersion of a copolymer prepared by emulsion polymerization of monomeric material containing from about 20 up to less than about 40 percent by weight of an ester of an ethylenically unsaturated carboxylic anhydride of a polycarboxylic acid containing from 4 to 8 carbon atoms and an ethoxylated alcohol selected from the group consisting of the following formulae:

$$R\text{—}O\text{—}(CH_2\text{—}CH_2O)_n\text{—}CH_2CH_2OH$$

and

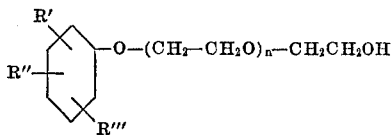

wherein R and R' are alkyl radicals containing from 8 to 24 carbon atoms, R'' and R''' are hydrogen or the alkyl radicals represented by R and R', and $n$ represents the degree of oxyethylation of the alcohol which ranges from about 6 to about 150 moles of ethylene oxide in the alcohol; and the balance consisting essentially of at least about 35 percent by weight of styrene, butadiene, or mixtures thereof, and thereafter adding an alkaline material to the aqueous system to adjust the system to a pH of from about 8 to about 10.

10. The method of claim 9 in which the alkaline material is a base selected from the group of inorganic and organic compounds containing monovalent cations consisting of sodium hydroxide, potassium hydroxide, lithium hydroxide, ammonium hydroxide, ethanolamine, morpholine, or diethanolamine.

References Cited

UNITED STATES PATENTS

| | | | |
|---|---|---|---|
| 3,002,940 | 10/1961 | Holloway | 260—29.6 TA X |
| 3,207,718 | 9/1965 | Zimmerman et al. | 260—29.6 H |
| 3,294,727 | 12/1966 | Grommers et al. | 260—29.6 EME |
| 3,297,620 | 1/1967 | Anderson et al. | 260—29.6 TA |
| 3,499,876 | 3/1970 | Field et al. | 260—78.5 |

WILLIAM H. SHORT, Primary Examiner

L. M. PHYNES, Assistant Examiner

U.S. Cl. X.R.

117—15; 260—29.6 ME, 47 EQ, 29.4 UA, 78.5 UA

UNITED STATES PATENT OFFICE
CERTIFICATE OF CORRECTION

Patent No. 3,657,175    Dated April 18, 1972

Inventor(s) Carl A. Zimmerman

It is certified that error appears in the above-identified patent and that said Letters Patent are hereby corrected as shown below:

Column 3, line 7, after "amount" should read -- of --; line 73, "ethylcycloehxyl" should read -- ethylcyclohexyl --. Column 8, line 16, "itaconic", second occurrence, should read -- itaconate --. Column 10, Table 2, column 3, line 7, "0.26" should read -- 0.62 --. Table 4, line 4, "i.1." should read -- i.e. --. Table 9, column 4, line 2, "2,650" should read -- 30,000 --. Column 13, line 62, "thickened" should read -- thicken --.

Signed and sealed this 7th day of November 1972.

(SEAL)
Attest:

EDWARD M. FLETCHER, JR.
Attesting Officer

ROBERT GOTTSCHALK
Commissioner of Patents